United States Patent
Patel et al.

(10) Patent No.: US 6,480,239 B1
(45) Date of Patent: Nov. 12, 2002

(54) GHOST CANCELLATION REFERENCE SIGNAL WITH BESSEL CHIRPS AND PN SEQUENCES, AND TV RECEIVER USING SUCH SIGNAL

(75) Inventors: Chandrakant Bhailalbhai Patel, Hopewell, NJ (US); Jian Yang, Bensalem, PA (US)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 09/575,259

(22) Filed: May 19, 2000

Related U.S. Application Data (63) Continuation of application No. 09/246,182, filed on Feb. 4, 1999, now Pat. No. 6,184,938, which is a division of application No. 08/158,299, filed on Nov. 29, 1993, which is a continuation-in-part of application No. 07/872,077, filed on Apr. 22, 1992, now abandoned, and a continuation-in-part of application No. 07/984,488, filed on Dec. 2, 1992, now abandoned.

(51) Int. Cl.$^7$ ................................. H04N 5/21
(52) U.S. Cl. ................................. 348/614
(58) Field of Search ................ 348/614, 608; H04N 5/21

(56) References Cited

U.S. PATENT DOCUMENTS

| | | | | |
|---|---|---|---|---|
| 4,255,791 A | 3/1981 | Martin | ...................... | 364/514 |
| 4,309,769 A | 1/1982 | Taylor, Jr. | ...................... | 375/1 |
| 4,359,778 A | 11/1982 | Lee | ...................... | 375/13 |
| 4,864,403 A | 9/1989 | Chao et al. | ...................... | 358/167 |
| 4,896,213 A | 1/1990 | Kobo et al. | ...................... | 358/147 |
| 5,032,916 A | 7/1991 | Matsuura et al. | ...................... | 358/167 |
| 5,084,901 A | 1/1992 | Nagazumi | ...................... | 375/1 |

(List continued on next page.)

FOREIGN PATENT DOCUMENTS

| | | | | |
|---|---|---|---|---|
| EP | 0 332 219 A2 | 9/1989 | ............ | H04N/5/21 |
| JP | 2-285866 | 11/1990 | ............ | H04N/5/21 |
| JP | 3-1664 | 1/1991 | ............ | H04N/5/21 |
| JP | 3-48579 | 3/1991 | ............ | H04N/5/21 |
| JP | 3-73677 | 3/1991 | ............ | H04N/5/21 |
| JP | 3-159480 | 7/1991 | ............ | H04N/5/21 |
| JP | 3-167968 | 7/1991 | ............ | H04N/5/21 |
| JP | 3-239073 | 10/1991 | ............ | H04N/5/21 |
| JP | 3-293870 | 12/1991 | ............ | H04N/5/21 |

*Primary Examiner*—Michael H. Lee
(74) *Attorney, Agent, or Firm*—Jae Nam Nah; Michael S. Dowler; Howrey Simon Arnold & White, LLP

(57) ABSTRACT

Composite ghost cancellation reference (GCR) signals that make available both a chirp and a PN sequence during the same vertical-blanking-interval (VBI) scan line in each successive field facilitate more rapid and efficient calculations of ghost cancellation and of equalization, on a continuing basis. A television receiver for use with such composite GCR signals includes circuitry for separating the chirp and PN sequence portions of the GCR signals from the remainder of the composite video signal, a ghost cancellation filter and an equalization filter connected in cascade to respond to the composite video signal and provided each with adjustable filtering weights, and a computer. Random-access memory addressed during writing snatches the vertical-blanking-interval scan lines selected to include GCR signals. Sets of four successive ones of the selected scan lines are then additively and subtractively combined to separate the chirp portions of the GCR signals from a remainder of the composite video signal. The sets of selected scan lines are additively and subtractively combined in another way to separate the PN sequence portions of the GCR signals form a remainder of the composite video signal. The computer responds to the separated chirp portions of the GCR signals to calculate a discrete Fourier transform (DFT) therefrom. The computer proceeds from that DFT to determine the adjustable filtering weights of the ghost cancellation filter. The computer thereafter responds to the separated PN sequences to determine the adjustable filtering weights of the equalization filter.

21 Claims, 6 Drawing Sheets

U.S. PATENT DOCUMENTS

| | | | |
|---|---|---|---|
| 5,099,328 A | 3/1992 | Kobo et al. | 358/167 |
| 5,103,312 A | 4/1992 | Citta | 358/167 |
| 5,121,211 A | 6/1992 | Koo | 358/187 |
| 5,138,453 A | 8/1992 | Kobayashi et al. | 358/167 |
| 5,170,260 A | 12/1992 | Tabata | 358/167 |
| 5,177,611 A | 1/1993 | Gibson et al. | 358/167 |
| 5,179,444 A | 1/1993 | Koo | 358/187 |
| 5,184,221 A | 2/1993 | Nishi et al. | 358/167 |
| 5,196,396 A | 3/1993 | Kobayashi et al. | 358/167 |
| 5,331,416 A | 7/1994 | Patel et al. | 348/614 |
| 5,335,009 A | 8/1994 | Sun et al. | 348/614 |
| 5,532,755 A | 7/1996 | Patel et al. | 348/614 |
| 5,600,380 A | 2/1997 | Patel et al. | 348/614 |
| 5,623,318 A | 4/1997 | Lee | 348/614 |
| 5,623,319 A | 4/1997 | Hill et al. | 348/614 |

GHOST CANCELLATION REFERENCE SIGNAL WITH BESSEL CHIRPS AND PN SEQUENCES, AND TV RECEIVER USING SUCH SIGNAL

This is a continuation of application Ser. No. 09/246,182, filed Feb. 4, 1999, now U.S. Pat. No. 6,184,938, which is a divisional of application Ser. No. 08/158,299, filed Nov. 29, 1993, which is a continuation-in-part of applications Ser. No. 07/872,077 filed Apr. 22, 1992, now abandoned, and Ser. No. 07/984,488 filed Dec. 2, 1992, now abandoned.

The invention relates to ghost cancellation reference (GCR) signals for use in a television receiver and to a television receiver employing those GCR signals.

BACKGROUND OF THE INVENTION

At the time U.S. patent application Ser. No. 07/872,077 was filed Subcommittee T-3 of the Advanced Television Systems Committee was meeting to determine a GCR signal for use in the United States. The GCR signal was to be a compromise based from two GCR signals, one using Bessel pulse chirp signals as proposed by U.S. Philips Corp. and one using pseudo noise (PN) sequences as proposed by the David Sarnoff Research Center (DSRC) of Stanford Research Institute. The GCR signals are inserted into selected vertical blanking intervals (VBIs). The GCR signals are used in a television receiver for calculating the adjustable weighting coefficients of a ghost-cancellation filter through which the composite video signals from the video detector are passed to supply a response in which ghosts are suppressed. The weighting coefficients of this ghost-cancellation filter are adjusted so it has a filter characteristic complementary to that of the transmission medium giving rise to the ghosts. The GCR signals can be further used for calculating the adjustable weighting coefficients of an equalization filter connected in cascade with the ghost-cancellation filter, for providing an essentially flat frequency spectrum response over the complete transmission path through the transmitter vestigial-sideband amplitude-modulator, the transmission medium, the television receiver front-end and the cascaded ghost-cancellation and equalization filters.

In the conventional method for cancelling ghosts in a television receiver, the discrete Fourier transform (DFT) of the ghosted GCR signal is divided by the DFT of the non-ghosted GCR signal (which latter DFT is known at the receiver from prior agreement with the transmitter) to obtain as a quotient the DFT transform of the transmission medium giving rise to ghosting; and the inverse DFT of this quotient is then used to define the filter weighting coefficients of a compensating ghost-cancellation filter through which the ghosted composite video signal is passed to obtain a de-ghosted composite video signal. To implement the DFT procedure efficiently, in terms of hardware or of calculations required in software, an integral power of two equal-bandwidth frequency bins are used in the DFT. The distribution of energy in the Philips chirp signal has a frequency spectrum extending continuously across the composite video signal band, in contrast to the DSRC PN sequence in which the distribution of energy does not extend continuously across the composite video signal band, but exhibits nulls in its frequency distribution. Accordingly, when the number of equal-bandwidth frequency bins in the DFT is reduced in order to speed calculation time, more accurate ghost cancellation is obtained with the chirp than with the PN sequence as GCR signal, the inventors observe.

During official testing by the Subcommittee, the DSRC GCR signal has exhibited somewhat better performance in regard to equalization of the passband after ghosting, which some experts including the Philips engineers, attribute to better filter hardware. Theoretically, equalization calculated over an entire active portion of the VBI, proceeding from the PN sequence, has an accuracy substantially the same as the accuracy available calculating equalization from the chirp signal. The entire length of the Philips chirp signal is needed to have the requisite information to implement equalization over the full composite video signal band. The PN sequence contains pulse transitions each of which transitions has substantially the entire frequency spectrum contained therein. The PN sequence contains many pulse transitions, each of which transitions has component frequencies extending over substantially the entire frequency spectrum. This property of the PN sequence, the inventors observe, permits the calculation of equalization taking samples at a prescribed sampling density only over a limited extent of the GCR signal. Taking samples over only a portion of the GCR signal causes some loss in the accuracy with which equalization can be calculated, particularly under poor signal-to-noise conditions. However, since the number of samples involved in the calculation of weighting coefficients for the equalization filter is reduced, there can be an appreciable increase in the speed with which equalization can be calculated, presuming the calculation is done using an iterative method such as least-mean-squares error reduction. Also, there is reduced complexity, in terms of hardware or of calculations required in software, with regard to calculating the equalization filter weighting coefficients.

At the time U.S. patent application Ser. No. 07/872,077 was filed the composite GCR signals comprised of chirps and PN sequence signals that had been proposed did not make available both a chirp and a PN sequence during the same VBI scan line. Subsequently, the Republic of China has adopted a standard GCR signal in which both a chirp and a PN sequence occur during a VBI scan line in each successive field.

SUMMARY OF THE INVENTION

The inventors observe that making both a chirp and a PN sequence available during each of selected VBI scan lines (e.g., a prescribed VBI scan line in each successive field, facilitates the more rapid and efficient calculations of ghost cancellation and of equalization, on a continuing basis, particularly when the transmission medium exhibits continual change—e.g., during the rapidly changing ghost conditions caused in over-the-air transmissions by overflying aircraft.

A television receiver embodying the invention in one of its aspects includes means for separating the chirp and PN sequence portions of the ghost cancellation reference (GCR) signal from the remainder of the composite video signal, a ghost cancellation filter and an equalization filter connected in cascade to respond to the composite video signal and provided each with adjustable filtering weights, means responding to the separated chirp portion of the GCR signal to calculate its discrete Fourier transform (DFT), means responding to that DFT to determine the adjustable filtering weights of the ghost cancellation filter, and means responding to the separated PN sequence to determine the adjustable filtering weights of the equalization filter.

DESCRIPTION OF ILLUSTRATIVE EMBODIMENTS

FIGS. 1A, 1B, 1C and 1D show the ghost cancellation reference signals in selected scan lines of the vertical blanking intervals of four successive fields of video. Insertion may be into any one (or more) of the 11th through 20th scan lines of each field, the present preference being to replace the vertical interval reference (VIR) signal currently used in the 19th scan line of each field. To simplify the description that follows, insertion of GCR signal into the 19th scan line of each field will be assumed by way of specific illustration.

The ghost cancellation reference signals of FIGS. 1A, 1B, 1C and 1D begin with horizontal synchronization pulses 11, 21, 31 and 41, respectively, which pulses are shown as being negative-going. The leading edges of the horizontal synchronization pulses are considered to be the beginning of VBI scan lines that are each of 63.55 microsecond duration in NTSC standard television signals. The horizontal synchronization pulses 11, 21, 31 and 41 are respectively followed during ensuing back-porch intervals by chroma bursts 12, 22, 32 and 42. The plus and minus signs near the chroma bursts 12, 22, 32 and 42 indicate their relative polarities respective to each other, per the NTSC standard.

Bessel pulse chirps 13, 23, 33 and 43 each of 33 microsecond duration begin 12 microseconds into the VBI scan lines of FIGS. 1A, 1B, 1C and 1D, respectively. The arrows associated with each of these chirps is indicative of its relative polarity with respect to the other chirps; chirp polarity is shown as alternating from frame to frame. These chirps swing plus/minus 40 IRE from 30 IRE "gray" pedestals which extend from 12 to 48 microseconds into these VBI lines. The gray level of the pedestals, the plus/minus swing of the chirps, the duration of the pedestals and the duration of the chirps have been specified to correspond as closely as possible to the Philips system that has been officially tested; and design variations were, at the time U.S. patent application Ser. No. 07/872,077 was filed, expected to occur should the compromise GCR signals described herein be adopted by the Subcommittee as their official recommendation for a standard.

Beginning at 51 microseconds into the VBI scan lines of FIGS. 1A, 1B, 1C and 1D 127-sample PN sequences 14, 24, 34 and 44 respectively occur. Each of the PN sequences 14, 24, 34 and 44 is of the same 9-microsecond duration as the others. The PN sequence in the final field of each frame is of opposite polarity from the PN sequence in the initial field of that frame and is of the same polarity as the PN sequence in the initial field of the next frame, as indicated by the arrows associated with respective ones of the PN sequences 14, 24, 34 and 44. These PN sequences have −1 and +1 values at −15 IRE and +95 IRE levels respectively. These PN sequences have been specified to correspond as closely as possible to the DSRC system that has been officially tested; and design variations were, at the time U.S. patent application Ser. No. 07/872,077 was filed, expected to occur should the compromise GCR signals described herein be adopted by the Subcommittee as their official recommendation for a standard.

There was, at the time U.S. patent application Ser. No. 07/872,077 was filed, opinion within the Subcommittee that the Bessel pulse chirp should be shortened to 17 microsecond duration so ghosts of up to 40 microsecond delay can be cancelled without the restriction that the VBI line following that containing the GCR signal having not to have information therein that changes from field to field. If the Bessel pulse chirp is shortened, the PN sequence could be made to be 255 pulse sample times, rather than 127 pulse sample times, in length. Adjustments to the compromise GCR signals described herein may be made so the swings of the Bessel pulse chirp and the PN sequence correspond, with suitable adjustment of the gray pedestal, if appropriate. The inventors favor the chirp swing being increased to extend over the range between the −15 IRE and +95 IRE levels and the gray pedestal being set at 40 IRE. The lesser range for the chirps was chosen by the Philips engineers for fear of overswing under some conditions, but the inventors believe that IF amplifier AGC will forestall such overswing. Extending the gray pedestal to the beginning of the PN sequence will then provide a signal that when low-pass filtered and subsequently gated during the mid-portion of the scan line will provide a level that is descriptive of 40 IRE level and can be used for automatic gain control of the composite video signal.

Figure 1A:
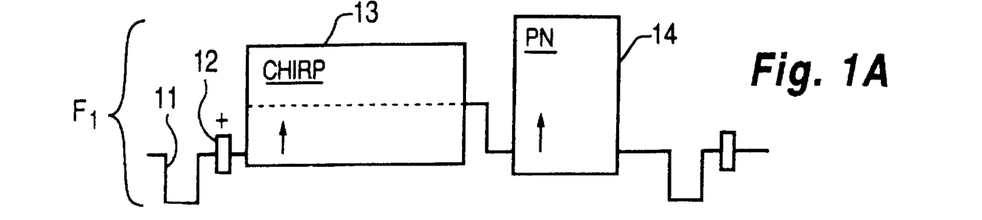
FIGS. 1A, 1B, 1C and 1D are waveforms of the ghost cancellation reference signals in selected vertical blanking intervals of four successive fields of video, as embody the invention in one of its aspects.
Figure 1B:
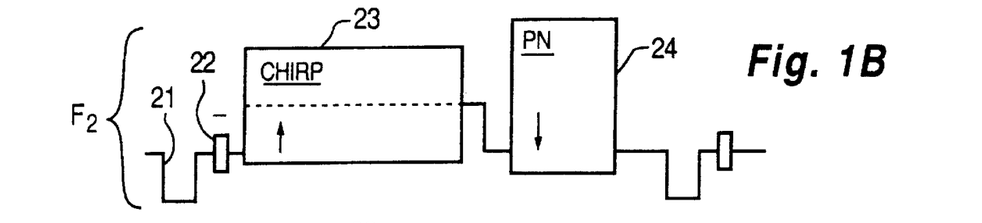
Figure 1C:
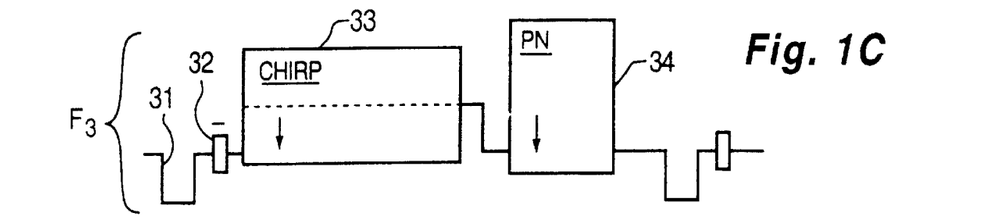
Figure 1D:
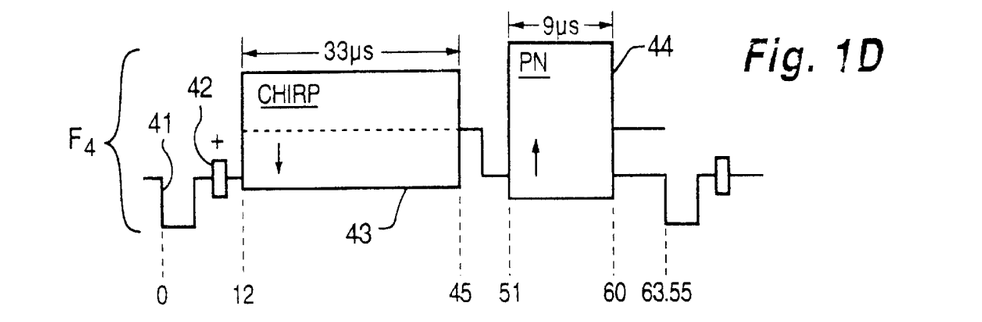
Figure 2:
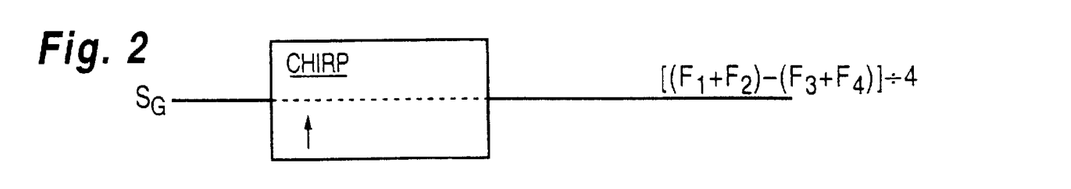
FIG. 2 is the waveform of a separated chirp signal as formed by differentially combining the sum of the ghost cancellation reference signals of FIGS. 1A and 1B with the sum of the ghost cancellation reference signals of FIGS. 1C and 1D.

FIG. 2 shows the separated Bessel pulse chirp waveform that results when the GCR signals from two successive fields that are in two successive frames are differentially combined, assuming that the GCR signals are of the sort shown in FIGS. 1A, 1B, 1C and 1D. A separated Bessel pulse chirp waveform per FIG. 2 results when the GCR signals of FIGS. 1B and 1C are differentially combined. A separated Bessel pulse chirp waveform per FIG. 2 also results when the GCR signals of FIGS. 1D and 1A are differentially combined. A separated Bessel pulse chirp waveform per FIG. 2 also results when the sum of the GCR signals of FIGS. 1A and 1B is differentially combined with the sum of GCR signals of FIGS. 1C and 1D.

Figure 3:
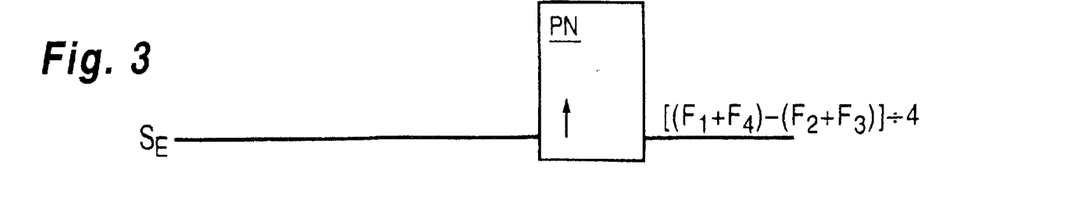
FIG. 3 is the waveform of a separated PN sequence as formed by differentially combining the sum of the ghost cancellation reference signals of FIGS. 1A and 1D with the sum of the ghost cancellation reference signals of FIGS. 1B and 1C.

FIG. 3 shows the waveform that results when the sum of the GCR signals of FIGS. 1A and 1D is differentially combined with he sum of GCR signals of FIGS. 1B and 1C. The Bessel pulse chirp waveform, the "gray" pedestal and the chroma burst are suppressed in this signal; and DC information concerning 0 IRE level is lost. The PN sequence is maintained as a separated PN sequence signal.

Figure 4:
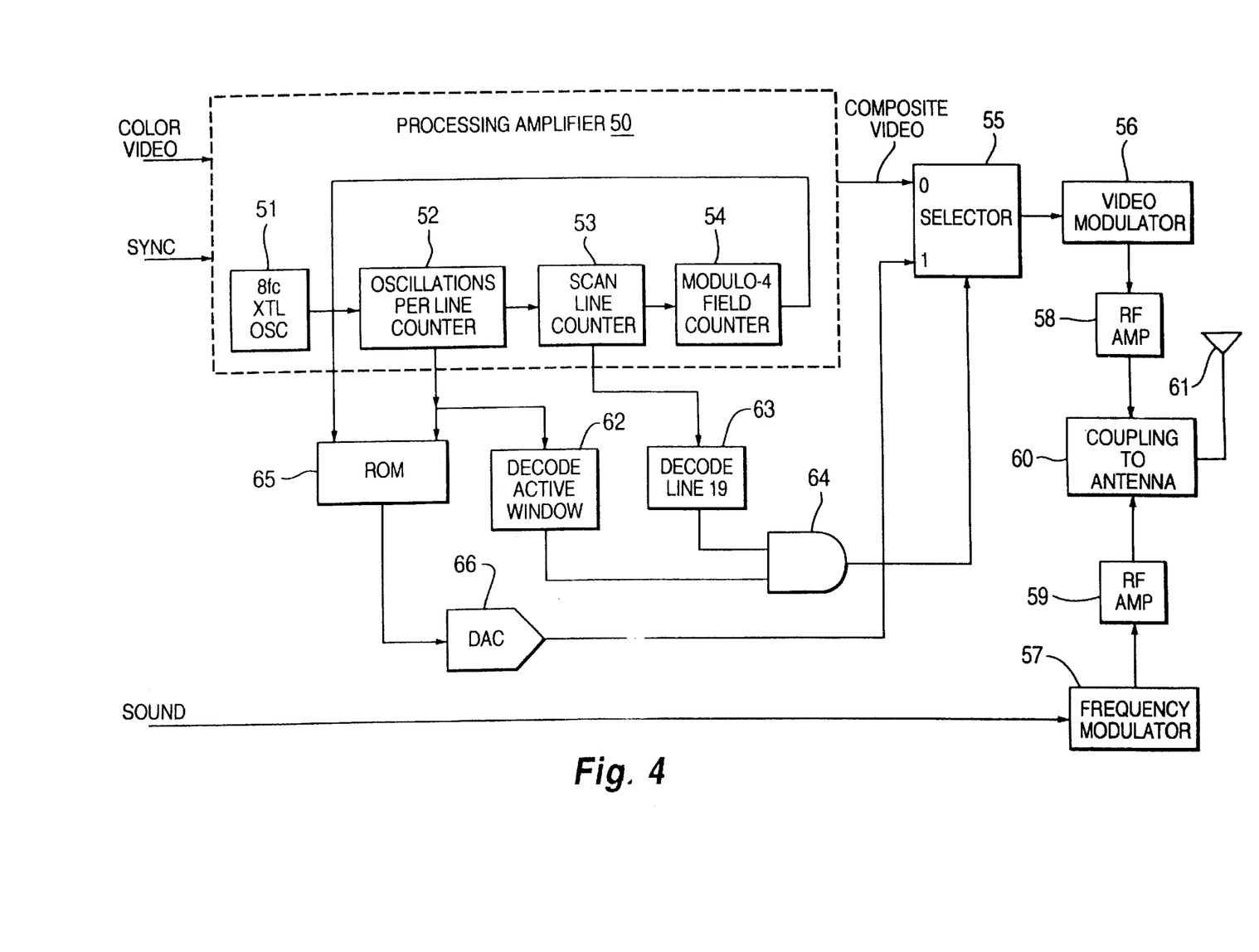
FIG. 4 is a schematic diagram of a television modulator arranged for transmitting the signals of FIGS. 1A, 1B, 1C and 1D.

FIG. 4 shows in block schematic form a television transmitter for NTSC color television signals into which are inserted GCR signals per FIGS. 1A, 1B, 1C and 1D. A processing amplifier 50 generates composite video signals proceeding from color video signals and synchronizing signals. By way of example, the color video signals may be red (R), green (G) and blue (B) signals from a studio color camera and the synchronizing signals may be from a studio sync generator that also supplies synchronizing signals to the studio color camera. Alternatively, the color video signals may be from a remote location and the synchronizing signals furnished by a genlock connection. Or, if the local transmitter is a low-power transmitter re-broadcasting signals received over-the-air from a distant high-power transmitter, the color video signals may be generated by demodulating the received composite video signal and the synchronizing signals may be separated from the received composite video signal.

The processing amplifier 50 is shown as including a crystal oscillator 51 furnishing oscillations at eight times color carrier frequency $f_c$, a counter 52 for counting the number of these oscillations per horizontal scan line, a counter 53 for counting scan lines per field, and a counter 54 for counting modulo-four successive fields of video signal. The processing amplifier 50 supplies its composite video output signal as a first input signal to an analog selector switch 55. The output signal from the analog selector switch 55 is supplied to a video modulator 56 to control the vestigial-sideband amplitude modulation of the video carrier. Sound signal is supplied to a frequency modulator 57. The modulated video and sound carriers are amplified by radio-frequency amplifiers 58 and 59, respectively, and the output signals from the amplifiers 58 and 59 are combined in a coupling network 60 to a broadcast antenna 60. A number of cariants of the conventional television transmitter arrangements described in this and the previous paragraph are known to those familiar with television transmitter design.

The analog selector switch 55 corresponds to that previously known for inserting the vertical interval reference (VIR) signal. A decoder 62 detects those portions of the count from the counter 52 associated with the "active" portions of horizontal scan lines—i.e., the portions of horizontal scan lines exclusive of the horizontal blanking intervals—to generate a logic ONE. A decoder 63 responds to the scan line count from the counter 53 to decode the occurrence of the 19th scan line in each field and generate a logic ONE. An AND gate 64 responds to these logic ONEs occurring simultaneously to condition the analog selector switch 55 to select a second input signal for application to the video modulator 56, rather than the composite video signal furnished from the processing amplifier 50 to the analog selector switch 55 as its first input signal. This second signal is not the VIR signal, however, but is in successive fields successive ones of the GCR signals depicted in FIGS. 1A, 1B, 1C and 1D (or, alternatively, in FIGS. 7A, 7B, 7C and 7D).

These GCR signals are stored in digitized form in a read-only memory 65. A first portion of the address for the ROM 65 is supplied from the counter 54, the modulo-four field count selecting which of the GCR signals depicted in FIGS. 1A, 1B, 1C and 1D is to be inserted in the current field. A second portion of the address for the ROM 65 is supplied from the counter 52 and scans the selected one of the GCR signals depicted in FIGS. 1A, 1B, 1C and 1D. The digitized GCR signal read from the ROM 65 is supplied to a digital-to-analog converter 66. The resulting analog GCR signal is supplied as the second input signal to the analog selector switch 55 for insertion into the "active" portion of the 19th line of the field.

Figure 5:
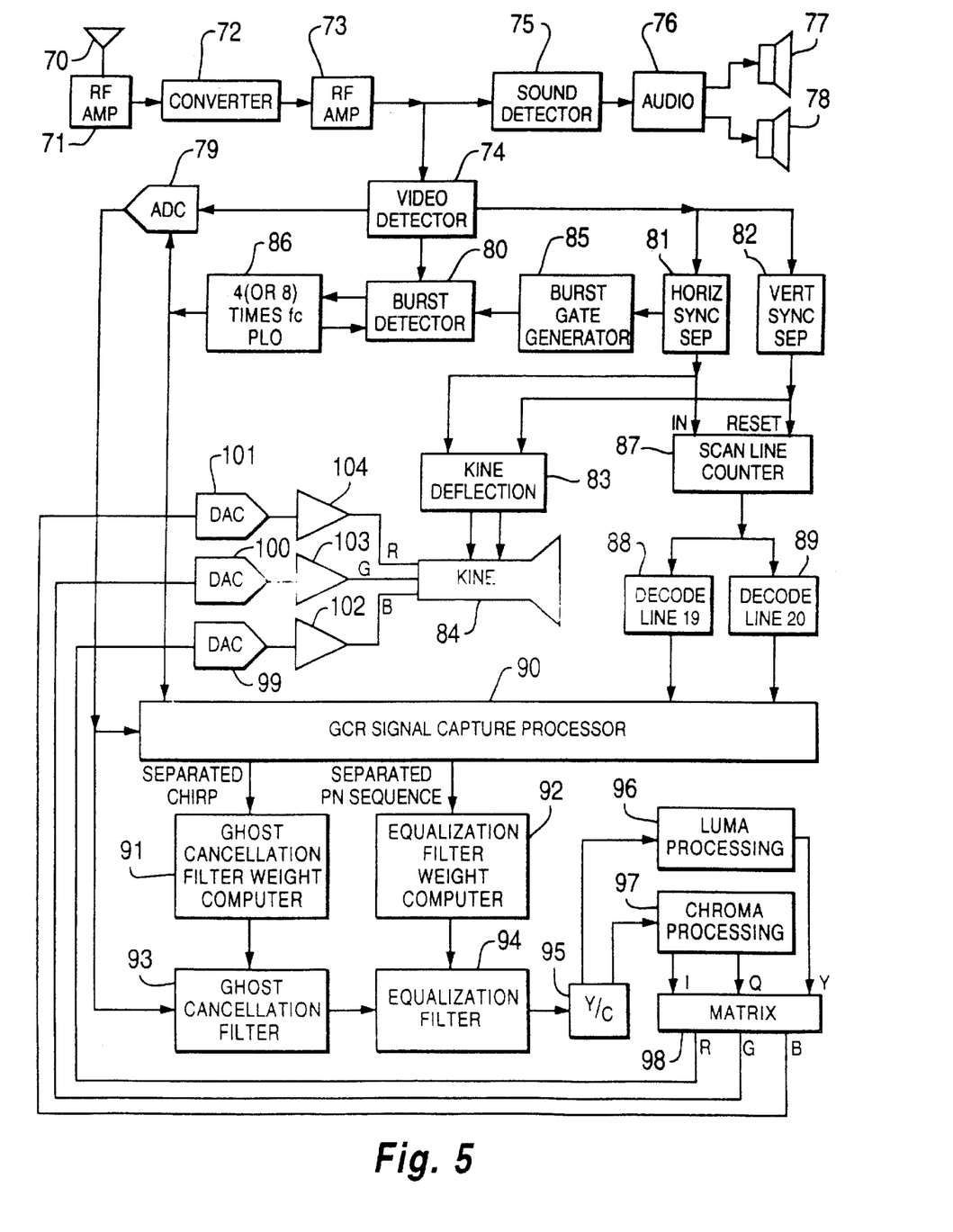
FIG. 5 is a schematic diagram of a television receiver arranged to receive television signals incorporating the ghost cancellation reference signals of FIGS. 1A, 1B, 1C and 1D, to a suppress ghosts accompanying those television signals and to equalize the transmission channel across the video bandwidth.

FIG. 5 depicts a television receiver arranged to receive television signals incorporating the ghost cancellation reference signals of FIGS. 1A, 1B, 1C and 1D. Television signals collected by an antenna 70 are amplified by a radio-frequency amplifier 71 and then down-converted to an intermediate frequency by a converter 72. An intermediate-frequency amplifier 73 supplies to a video detector 74 and to a sound detector 75 amplified response to the intermediate-frequency signals from the converter 72. The sound detector 75 demodulates the frequency-modulated sound carrier and supplies the resulting sound detection result to audio electronics 76. The audio electronics 76, which may include stereophonic sound detection circuitry, includes amplifiers for supplying amplified sound-descriptive electric signals to loudspeakers 77 and 78.

The video detector 74 supplies analog composite video signal to an analog-to-digital converter 79, to a burst detector 80, to a horizontal sync separator 81 and to a vertical sync separator 82. The separated horizontal synchronizing pulses from the horizontal sync separator 81 and the separated vertical synchronizing pulses from the vertical sync separator 82 are supplied to kinescope deflection circuitry 83, which generates deflection signals for a kinescope 84. A burst gate generator 85 generates a burst gate signal an appropriate interval after each horizontal sync pulse it is supplied from the horizontal sync separator 81. This burst gate signal keys the burst detector 80 into operation during chroma burst interval. The burst detector 80 is included in a phase-locking loop for a phase-locked oscillator 86. The phase-locked oscillator 86 oscillates at a frequency sufficiently high that the analog-to-digital converter 79 sampling the analog composite video signal from the video detector 74 once with each oscillation oversamples that signal. As is well-known, it is convenient from the standpoint of simpler digital hardware design that phase-locked oscillator 86 oscillate at a frequency that is an integral of two greater than the 3.58 MHz color subcarrier frequency. Sampling chroma signals four or eight times per cycle is preferred.

The separated horizontal sync pulses from the horizontal sync separator 81 are supplied to a scan line counter 87 for counting, the scan line count from which counter 87 is reset to zero at the outset of each vertical sync interval by separated vertical sync pulses from the vertical sync separator 82. Indication in the count from the counter 87 of the occurrence of the 19th scan line in each field is detected by a decoder 88. Indication in the count from the counter 87 of the occurrence of the 20th scan line in each field is detected by a decoder 89. The occurrences of the 19th and 20th scan line in each field is signaled to a GCR signal capture processor 90, which captures the GCR signals in the 19th scan line of each field of digital composite video signal from the analog-to-digital converter 79. This capturing process will be described in greater detail in connection with the description of FIG. 6.

The GCR signal capture processor 90 includes circuitry for separating the Bessel pulse chirp portion of the captured GCR signals, which portion is supplied to a ghost-cancellation filter weight computer 91. The GCR signal capture processor 90 also includes circuitry for separating the PN sequence portion of the captured GCR signals, which portion is supplied to an equalization filter weight computer 92. The digitized composite video signal from the analog-to-digital converter 79 is supplied via a cascade connection of a ghost-cancellation filter 93 and an equalization filter 94 to a luma/chroma separator 95. The ghost-cancellation filter 93 has filtering weights adjustable in response to results of the computations by the ghost-cancellation filter weight computer 91, and the equalization filter 94 has filtering weights adjustable in response to results of the computations by the equalization filter weight computer 92.

The ghost-cancellation filter weight computer 91 is preferably of a type in which the discrete Fourier transform (DFT) of the ghosted GCR signal is divided by the DFT of the non-ghosted GCR signal to obtain as a quotient the DFT transform of the transmission medium giving rise to ghosting; and the inverse DFT of this quotient is then used to define the filter weighing coefficients of a compensating ghost-cancellation filter. As known by those skilled in the ghost-cancellation art, the ghost-cancellation filter 93 is preferably of a type with a sparse kernel where the positioning of the non-zero filter weights can be shifted responsive to results from the ghost-cancellation filter weight computer 91. A ghost-cancellation filter with a dense kernel would typically require 2048 filter weights, which would be difficult to construct in actual practice.

The equalization filter weight computer 92 could be of a type performing calculations using DFTs, the results of which are subject to inverse-DFT in order to define the filter weighing coefficients of a compensating equalization filter 94. Preferably, however, the equalization filter weight computer 92 is of a type using a least-mean-square error method to perform an interative adjustment of a 15-tap or so digital FIR filter used as the equalization filter 94, adjustment being made so that there is a best match to the (sin x)/x function of the result of correlating of a portion of the de-ghosted PN sequence with the corresponding portion of the PN sequence known at the receiver as being a standard.

The luma/chroma separator 95 is preferably of a type using digital comb filtering for separating a digital luminance signal and a digital chroma signal from each other, which signals are respectively supplied to digital luminance processing circuitry 96 and to digital chrominance processing circuitry 97. The digital luminance (Y) signal from the digital luminance processing circuitry 96 and the digital I and Q signals from the digital chrominance processing circuitry 97 are supplied to a digital color matrixing circuit 98. Matrixing circuit 98 responds to the digital Y, I and Q signals to supply digital red (R), green (G) and blue (B) signals to digital-to-analog converters 99, 100 and 101, respectively. Analog red (R), green (G) and blue (B) signals are supplied from the digital-to-analog converters 99, 100 and 101 to R, G and B kinescope driver amplifiers 102, 103 and 104, respectively. The R, G and B kinescope driver amplifiers 102, 103 and 104 supply red (R), green (G) and blue (B) drive signals to the kinescope 84.

The filter 94 has thusfar been termed an "equalization filter" and considered to be a filter that would provide a flat frequency response through the band, which is the way this filter has been characterized by other workers in the ghost-cancellation art. In practice it is preferable to adjust the filter weights in the filter 94, not for flat frequency response through the band, but with a frequency response known to provide some transient over- and under-shooting, or video peaking. This reduces the need for providing transient overshooting or video peaking in the digital luma processing circuitry 96.

Figure 6:
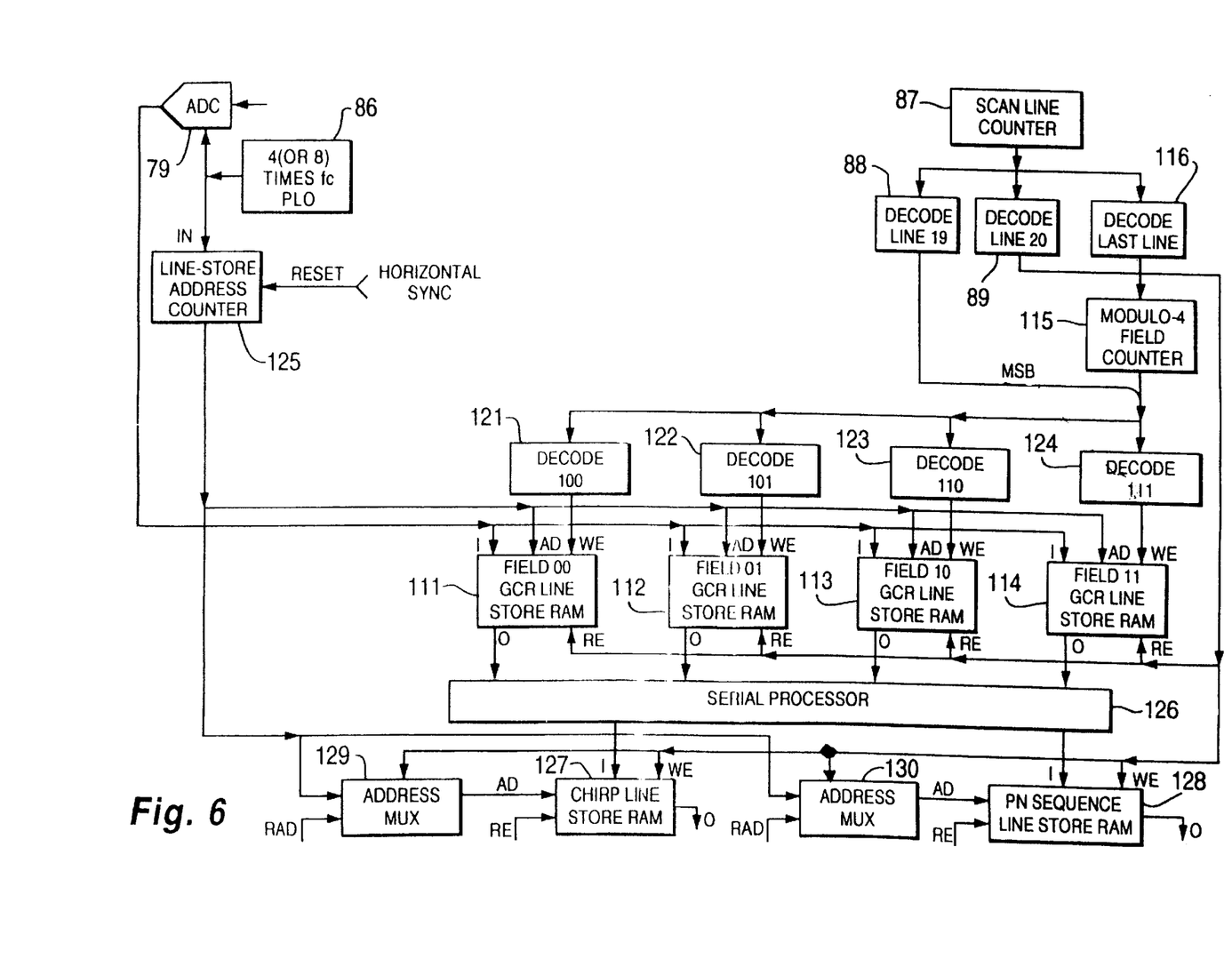
FIG. 6 is a schematic diagram of the GCR signal capture processor shown as a block in FIG. 5.

FIG. 6 shows a representative way of constructing the GCR signal capture processor 90. Random access memories 111, 112, 113 and 114 are arranged to serve as line stores for the GCR reference signals supplied during fields 00, 01, 10 and 11 of each cycle of four successive fields of digitized composite video signal. These GCR reference signals are supplied to the respective input ports of the RAMs 111, 112, 113 and 114 from the analog-to-digital converter 79. The four successive fields in each cycle are counted modulo-4 by a two-stage binary counter 115 that counts the ONEs generated by a decoder 116 that detects indications of the last scan line in a field furnished by the scan line count from the counter 87. As a preparatory measure in the procedure of updating the filter weighting coefficients in the ghost-cancellation filter 93 and in the equalization filter 94, the proper phasing of the modulo-4 field count can usually be determined by correlating the most recently received GCR signal, as de-ghosted, with each of the four standard GCR signals stored in the receiver, looking for best match. Decoders 121, 122, 123 and 124 decode the 100, 101, 110 and 111 signals as generated by the 19th line decoder 88 supplying most significant bit and field count from the field counter 115 supplying the two less significant bits, thereby to furnish write enable signals sequentially to the RAMs 111, 112, 113 and 114 during the 19th scan lines of successive fields.

The RAMs 111, 112, 113 and 114 are addressed in parallel by an address counter 125 that counts the number of samples per scan line. The address counter 125 receives the oscillations from the phase-locked oscillator 86 at its count input connection, and is reset by an edge of the horizontal sync pulse. This addressing scan during the 19th scan line allocates each successive digital composite video signal sample to a successive addressable location in the one of the RAMs 111, 112, 113 and 114 receiving a write enable signal. During the 20th scan line the decoder 89 provides a read enable signal to all of the RAMs 111, 112, 113 and 114. The addressing scan the counter 125 provides the RAMs 111, 112, 113 and 114 during the 20th scan line reads out the four most recently received and stored GCR signals parallely to a serial processor 126 that combines them to generate sequential samples of a separated Bessel pulse chirp signal and sequential samples of a separated PN sequence.

During the 20th scan line, the decoder 89 also provides a write enable signal to RAMs 127 and 128 that respectively serve as line stores for the separated chirp signal and separated PN sequence. The decoder 89 at the same time conditions address multiplexers 129 and 130 to select addresses from the address counter 125 as write addressing for the RAMs 127 and 128 respectively. The counter 125 provides the RAM 127 the addressing scan needed to write thereinto the sequential samples of the separated chirp signal from the serial processor 126. The counter 125 also provides the RAM 128 the addressing scan needed to write thereinto the sequential samples of the separated PN sequence from the serial processor 126. At times other than the 20th scan line, the address multiplexer 129 selects to the RAM 127 read addressing supplied to its RA terminal from the ghost-cancellation filter weight computer 91 during data fetching operations, in which operations the computer 91 also supplies the RAM 127 a read enable signal. The RAM 127 supplies, at times other than the 20th scan line, the address multiplexer 130 selects to the RAM 128 read addressing supplied to its RA terminal from the equalization filter weight computer 92 during data fetching operations, in which operations the computer 92 also supplies the RAM 128 a read enable signal. The RAMs 127 and 128 have respective O terminal for supplying read output signals the ghost-cancellation filter weight computer 91 and to the equalization filter weight computer 92, respectively.

Figure 7A:
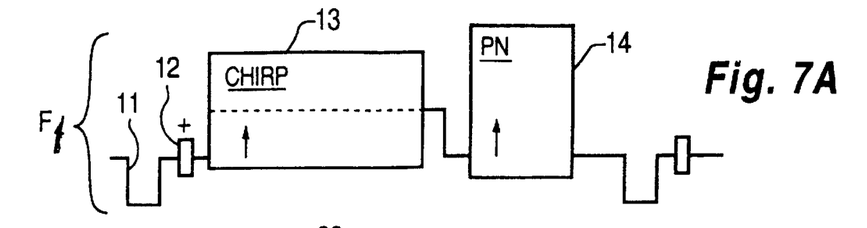
FIGS. 7A, 7B, 7C and 7D are waveforms of the ghost cancellation reference signals in selected vertical blanking intervals of four successive fields of video, as embody the invention in one of its aspects, alternative to the aspect of the invention illustrated by FIGS. 1A, 1B, 1C and 1D.
Figure 7B:
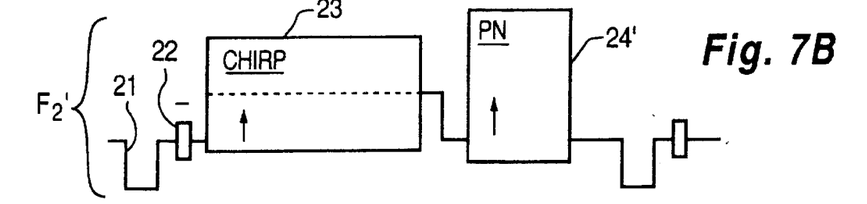
Figure 7C:
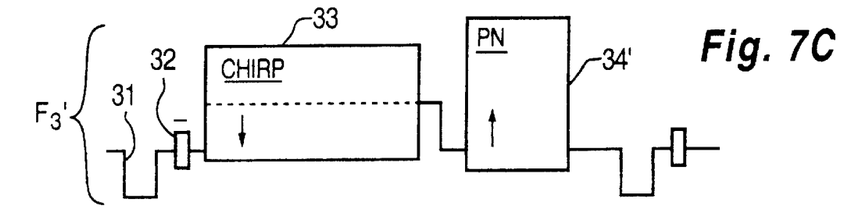
Figure 7D:
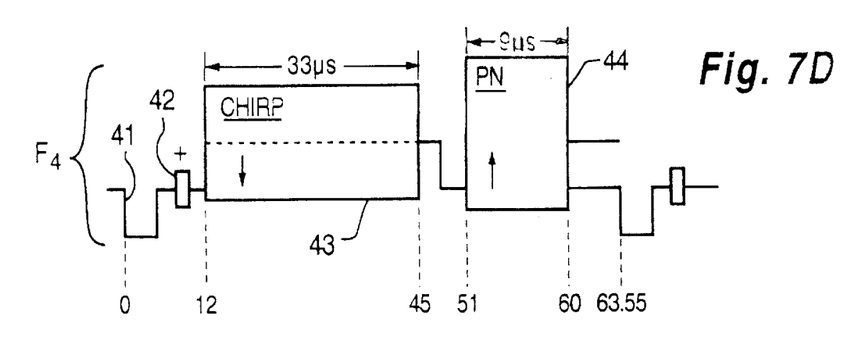

FIGS. 7A, 7B, 7C and 7D are waveforms of the ghost cancellation reference signals in selected vertical blanking intervals of four successive fields of video, as embody the invention in one of its aspects, alternative to the aspect of the invention which FIGS. 1A, 1B, 1C and 1D concern. The GCR signals in FIGS. 7A and 7D are the same as those of FIGS. 1A and 1D. The GCR signals in FIGS. 7B and 7C differ from those of FIGS. 1B and 1C in that the swings of the PN sequences are reversed in direction. In FIGS. 7B and 7C the swings of the PN sequences 24' and 34' are in the same direction as the swings of the PN sequences 14 and 44 in FIGS. 7A and 7D.

Figure 8:
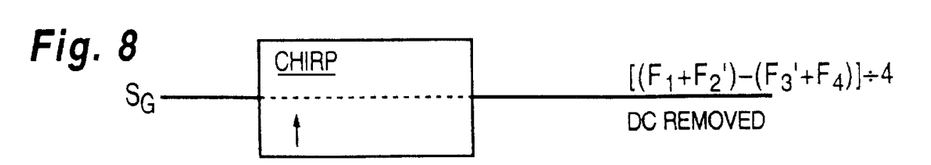
FIG. 8 is the waveform of a separated chirp signal as formed by combining the ghost cancellation reference signals of FIGS. 7B and 7C, of FIGS. 7D and 7A, or FIGS. 7A, 7B, 7C and 7D.

FIG. 8 shows the separated Bessel pulse chirp waveform that results when the GCR signals from two successive fields that are in two successive frames are differentially combined, assuming that the GCR signals are of the sort shown in FIGS. 7A, 7B, 7C and 7D. A separated Bessel pulse chirp waveform per FIG. 8 results when the GCR signals of FIGS. 7B and 7C are differentially combined. A separated Bessel pulse chirp waveform per FIG. 8 also results when the GCR signals of FIGS. 7D and 7A are differentially combined. A separated Bessel pulse chirp waveform per FIG. 8 also results when the sum of the GCR signals of FIGS. 7A and 7B is differentially combined with the sum of the GCR signals of FIGS. 7C and 7D.

Figure 9:
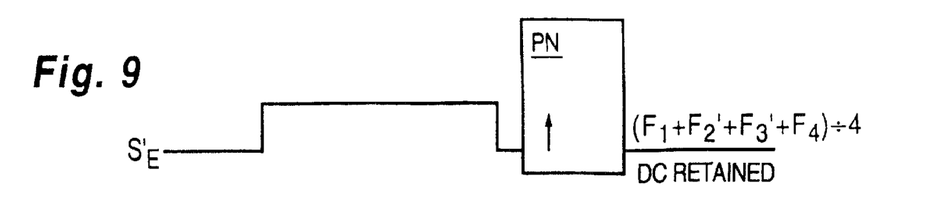
FIG. 9 is the waveform of a separated PN sequence preceded by a "gray" pedestal, as formed by combining the ghost cancellation reference signals of FIGS. 7A, 7B, 7C and 7D.

FIG. 9 shows the waveform that results when the GCR signals from four (or any multiple of four) successive fields are additively combined or are averaged, assuming that the GCR signals are of the sort shown in FIGS. 7A, 7B, 7C and 7D. The Bessel pulse chirp waveform and the chroma burst are suppressed in this signal. The DC level and "gray" pedestal are maintained in this signal as well as the PN sequence. The PN sequence can then be separated by high-pass digital filtering. The DC level and "gray" pedestal can be separated by low-pass digital filtering. The DC level and "gray" pedestal are useful in circuitry for controlling the gain and DC-offset of the analog composite signal applied to the analog-to-digital converter 79. Circuits are known in the prior art in which the digital output signal of an analog-to-digital converter is selected as input signal to a first digital comparator during a portion of the digitized composite video signal known to be supposedly at 0 IRE level, there to be compared against digitized ideal 0 IRE level to develop a first digital error signal that is converted to analog error by a digital-to-analog converter and fed back to degenerate error in the 0 IRE level against which the input signal to the analog-to-digital converter is DC-restored. In certain of these circuits the digital output signal of the same analog-to-digital converter is selected as input signal to a second digital comparator during a portion of the digitized composite video signal known to be supposedly at a prescribed pedestal level, there to be compared against the prescribed pedestal level in digital form to develop a second digital error signal that is converted to analog error by a digital-to-analog converter and fed back as an automatic gain control (AGC) signal to a gain-controlled amplifier preceding the analog-to-digital converter and keeping the input signal to the analog-to-digital converter quite exactly within the bounds of the conversion range.

Figure 10:
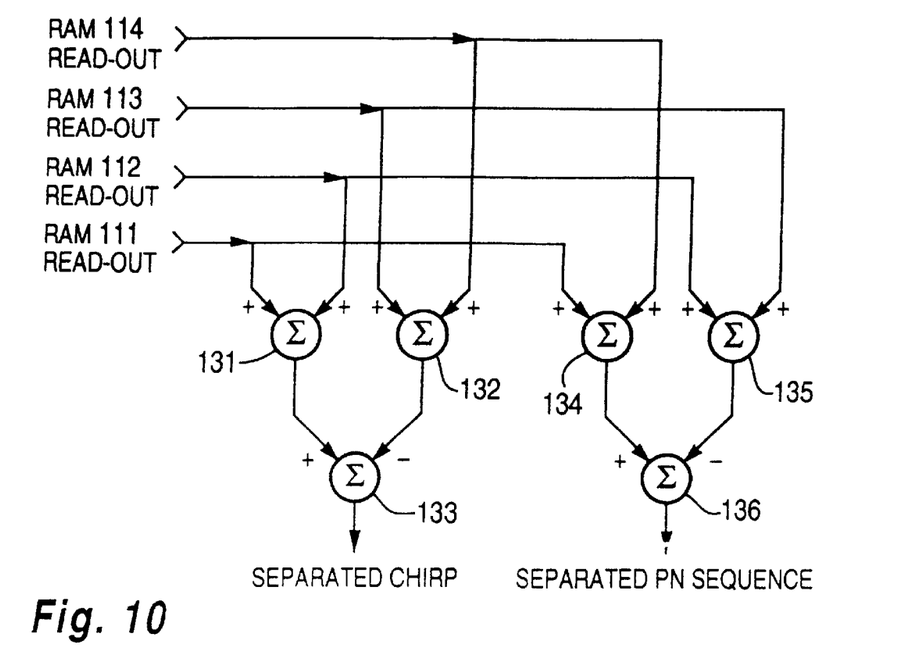
FIG. 10 is a schematic diagram of the FIG. 6 serial processor for processing the ghost cancellation reference signals of FIGS. 1A, 1B, 1C and 1D to generate FIG. 2 and FIG. 3 signals.

FIG. 10 shows how the FIG. 6 serial processor may be constructed for processing the ghost cancellation reference signals of FIGS. 1A, 1B, 1C AND 1D to generate the FIG. 2 and FIG. 3 signals. A serial adder 131 sums the RAM 111 output signal per FIG. 1A with the RAM 112 output signal per FIG. 1B. A serial adder 132 sums the RAM 113 output signal per FIG. 1C with the RAM 114 output signal per FIG. 1D. A serial subtractor 133 subtracts the sum output of the adder 132 from the sum output of the adder 131 to generate a separated Bessel pulse chirp signal. With a bit point shift of two places towards less significance, for carrying out wired division by four, this separated Bessel pulse chirp signal is the FIG. 2 signal. A serial adder 134 sums the RAM 111 output signal per FIG. 1A with the RAM 114 output signal per FIG. 1D. A serial adder 135 sums the RAM 112 output signal per FIG. 1B with the RAM 113 output signal per FIG. 1C. A serial subtractor 136 subtracts the sum output of the adder 135 from the sum output of the adder 134 to generate a separated PN sequence signal. With a bit point shift of two places towards less significance, for carrying out wired division by four, this separated PN sequence signal is the FIG. 3 signal.

Figure 11:
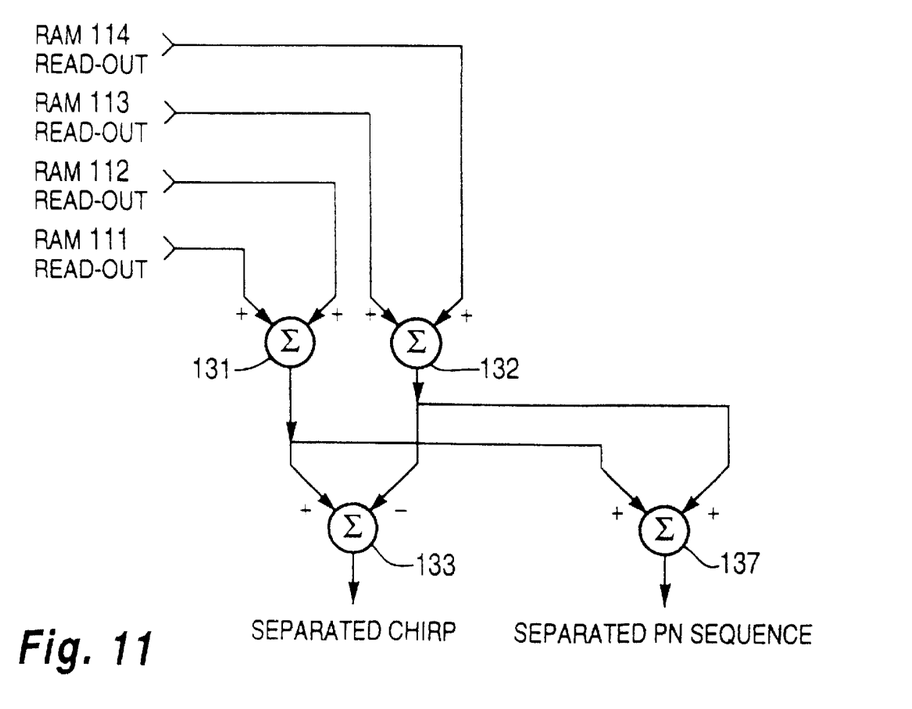
FIG. 11 is a schematic diagram of the FIG. 6 serial processor for processing the ghost cancellation reference signals of FIGS. 7A, 7B, 7C and 7D to generate the FIG. 8 and FIG. 9 signals.

FIG. 11 shows how the FIG. 6 serial processor may be constructed for processing the ghost cancellation reference signals of FIGS. 7A, 7B, 7C and 7D to generate the FIG. 8 and FIG. 9 signals. Serial adders 131 and 132 and serial subtractor 133 cooperate to generate a separated Bessel pulse chirp signal, as described in connection with FIG. 10. With a bit point shift of two places towards less significance, for carrying out wired division by four, this separated Bessel pulse chirp signal is the FIG. 8 signal. A serial adder 137 sums the sum outputs of the adders 131 and 132 to generate a separated PN sequence signal. With a bit point shift of two places towards less significance, for carrying out wired division by four, this separated PN sequence signal is the FIG. 9 signal.

The foregoing description assumes that only one VBI scan line per field is made available by television broadcasters. The availability of two successive VBI scan lines in each field allows their being added to cancel color burst within the period of a single scan line, lessening the possibility that fast fading conditions will lead to imperfect cancellation of color burst or to misalignment of GCR signals when they are combined. Also, the time required to acquire the data necessary for the calculations of ghost cancellation and equalization parameters is halved. By way of example, the GCR signals of FIGS. 1A and 1B could be in the 19th and the 20th scan lines of the first field of each frame; and the GCR signals of FIGS. 1C and 1D could be in the 19th and 20th scan lines of the second field of each frame. Alternatively, by way of further example, the GCR signals of FIGS. 7A and 7B could be in the 19th and the 20th scan lines of the first field of each frame; and the GCR signals of FIGS. 7C and 7D could be in the 19th and the 20th scan lines of the second field of each frame.

The FIG. 5 television receiver can be modified to include a 1H delay line connected at its input to receive video signal from the video detector 74. This facilitates addition of the 19th and the 20th scan lines of each field being done in the analog regime by adding the signals at the input and output of a 1H delay line to supply input signal to the ADC 79. Where the GCR signals of FIGS. 7A–7D are used, the color burst is cancelled and both the chirp and PN sequence signals are strengthened prior to digitization by the ADC 79.

This reduces errors arising from round-off during digitization and from the sampling during digitization not being timed exactly the same from line to line. The decoders 88 and 89 are modified to detect scan lines 20 and 21, thus taking into account the delay introduced by the 1H delay line. Alternatively, modifications of the FIG. 5 television receiver can be such that the 19th and the 20th scan lines of each field are combined in the digital regime; this is done through suitable modification of the GCR signal capture processor, changing the read and write addressing of the GCR line-store RAMs therein. Instead of including GCR signal components in the 19th and the 20th scan lines of each field, GCR signal can be included in the 18th and the 19th scan lines of each field. In still other alternatives, GCR signal components are included in the 18th and the 20th scan lines of each field, so that horizontal sync as well as color burst portions of the signal can be suppressed by differentially combining the corresponding pixels of the two scan lines, while anti-phase chirp or PN sequence components combine constructively.

The voluntary standard for GCR signals in the United States is now the U.S. Philips Corp. proposal using Bessel chirps. The voluntary standard is described in a paper by L. D. Claudy and S. Herman entitled "GHOST CANCELING: A New Standard for NTSC Broadcast Television" and presented Sep. 17, 1992 at the IEEE Broadcast Technology Symposium in Washington D.C. The foregoing teachings in regard to television receiver design have application to GCR signals per the voluntary standard, particularly with regard to the GCR signal capture processor and to the extraction of chirp pedestal information. The GCR signals of the voluntary standard are inserted into the 19th line of each field and repeat in an eight-field cycle, rather than the four-field cycle explicitly described above. The GCR signal capture processor 90 as shown in FIG. 6 is readily modified to augment the modulo-4 field counter 115 with an additional counter stage or two, thereby to provide a modulo-8 field counter or a modulo-16 field counter; to add additional GCR signal line store RAMs for storing one or two eight-field cycles of the GCR signals of the voluntary standard; and to add field-count decoders for selectively writing the additional GCR signal line store RAMs. Initial rough calculations of ghost cancellation parameters may be made by combining only a pair of the GCR signals of the voluntary standard, so as to separate chirp signal, with a greater number of pairs of GCR signals being combined later on to support refined calculations of ghost cancellation parameters. The computation of equalizing parameters for application to the equalization filter 94 is done proceeding from the separated Bessel chirp, rather than from a separated PN sequence, of course.

Further refinements in the inventor's GCR signal capture processor are described in their U.S. patent application Ser. No. 07/984,488 filed Dec. 2, 1992 and entitled GHOST CANCELATION REFERENCE SIGNAL ACQUISITION CIRCUITRY, AS FOR TV RECEIVER OR VIDEO RECORDER, the drawing and specification of which are appended hereto for incorporation herein.

One skilled in the art of electronic circuits and systems design and acquainted with the foregoing disclosure will be enabled to design a number of variants of the signals and circuits specifically disclosed; and this should be borne in mind when considering the respective scopes of the claims which follow.

What is claimed is:

1. An apparatus for transmitting a television signal divided into a plurality of successive fields for reception by a television receiver including adaptive ghost suppression filtering, each said field consisting of a prescribed number of lines of information, said lines being of uniform respective duration, said apparatus characterized by including:

a reference signal generator for transmitting during a prescribed single line of each of said fields a first ghost-cancellation reference signal and a second ghost-cancellation reference signal different than said first ghost-cancellation reference signal, each of said first and said second ghost-cancellation reference signals being transmitted with a modulation swing less than the maximum modulation swing available but more than half said maximum modulation swing, the relative phases of said first and said second ghost-cancellation reference signals varying from field to field in prescribed pattern to facilitate their separation at said television receiver, said first ghost-cancellation reference signal having a prescribed first duration longer than half a line duration to provide said television receiver sufficient energy for detecting ghosts with long differential delay and low energy to furnish a basis for calculation of adjustments of said adaptive ghost suppression filtering to suppress said ghosts with long differential delay and low energy, and said second ghost-cancellation reference signal having a prescribed second duration shorter than half a line duration to facilitate more rapid calculation of adjustments of said adaptive ghost suppression filtering in said television receiver to suppress ghosts with substantial energy and less differential delay.

2. The apparatus of claim 1, wherein at least one of said first and said second ghost-cancellation reference signals is a pseudo-noise (PN) sequence.

3. The apparatus of claim 1, wherein said second ghost-cancellation reference signal is a pseudo-noise (PN) sequence.

4. The apparatus of claim 1, wherein said second ghost-cancellation reference signal follows said first ghost-cancellation reference signal in said prescribed single line of each of said fields.

5. The apparatus of claim 4, wherein said first reference signal is a Bessel chirp signal.

6. The apparatus of claim 4, wherein said second ghost-cancellation reference signal is a pseudo-noise (PN) sequence.

7. A receiver, including adaptive ghost suppression filtering, for receiving a signal transmission over a reception channel, said signal transmission divided into a plurality of successive fields having a prescribed number of lines of information and being of uniform respective duration, said receiver including:

an input for receiving in a prescribed single line of each of said fields a first ghost-cancellation reference signal and a second ghost-cancellation reference signal different than said first ghost-cancellation reference signal, each of said first and said second ghost-cancellation reference signals having a modulation swing less than the maximum modulation swing available but more than half said maximum modulation swing, the relative phases of said first and said second ghost-cancellation reference signals varying from field to field in prescribed pattern to facilitate their separation by said receiver, said first ghost-cancellation reference signal having a prescribed first duration longer than half a line duration to provide said receiver sufficient energy for detecting ghosts with long differential delay and low energy to furnish a basis for calculation of adjustments of said adaptive ghost suppression filtering to suppress said ghosts with long differential delay and low energy, and said second ghost-cancellation reference signal having a prescribed second duration shorter than half a line duration to facilitate more rapid calculation of adjustments of said adaptive ghost suppression filtering in said receiver to suppress ghosts with substantial energy and less differential delay.

8. The receiver of claim 7, wherein at least one of said first and said second ghost-cancellation reference signals is a pseudo-noise (PN) sequence.

9. The receiver of claim 7, wherein said second ghost-cancellation reference signal is a pseudo-noise (PN) sequence.

10. The receiver of claim 7, wherein said second ghost-cancellation reference signal follows said first ghost-cancellation reference signal in said prescribed single line of each of said fields.

11. The receiver of claim 10, wherein said first reference signal is a Bessel chirp signal.

12. The receiver of claim 10, wherein said second ghost-cancellation reference signal is a pseudo-noise (PN) sequence.

13. A television apparatus comprising:

a receiver adapted for receiving a television signal in a predetermined signal format over a reception channel, said signal format comprising a frame having a first field and a second field, (1) wherein said first field comprises:
  (1a) at least one segment which has a set of values which are known in advance by the receiver of said television apparatus, wherein said segment includes:
    (i) a first ghost cancellation reference signal, and
    (ii) a second ghost cancellation reference signal including pseudo noise sequence, wherein said first reference signal is longer than said second reference signal; and
  (1b) an image signal containing image content of said television signal; and (2) wherein said second field comprises:
  (2a) at least one segment which has a set of values which are known in advance by the receiver of said television apparatus, wherein said segment includes:
    (i) a first ghost cancellation reference signal, and
    (ii) a second ghost cancellation reference signal including pseudo noise sequence, said pseudo noise sequence of said second field being of opposite polarity to said pseudo noise sequence of said first field, wherein said first reference signal is longer than said second reference signal; and
  (2b) an image signal containing image content of said television signal; and a processor for processing at least one of said first ghost cancellation reference signal and said second ghost cancellation reference signal for determining information to be used for reducing multi-path distortion.

14. A television signal format comprising:

a frame including a first field and a second field, (1) wherein said first field comprises:
  (1a) at least one segment which has a set of values which are known in advance by a receiver of said television signal format, wherein said segment includes:
    (i) a first ghost cancellation reference signal, and
    (ii) a second ghost cancellation reference signal including pseudo noise sequence, wherein said first reference signal is longer than said second reference signal; and
  (1b) an image signal containing image content of the television signal; and (2) wherein said second field comprises:
  (2a) at least one segment which has a set of values which are known in advance by a receiver of said television signal format, wherein said segment includes:
    (i) a first ghost cancellation reference signal, and
    (ii) a second ghost cancellation reference signal including pseudo noise sequence, said pseudo noise sequence of said second field being of opposite polarity to said pseudo noise sequence of said first field, wherein said first reference signal is longer than said second reference signal; and
  (2b) an image signal containing image content of the television signal.

15. A circuit for processing a digitized television signal, said digitized television signal comprising a succession of frames, where each of said frames comprises a first field and a second field, and where each of said fields comprises a specified number of lines, one of said lines being designated to carry a first ghost-cancellation reference signal and a second ghost-cancellation reference signal, said circuit comprising:

signal recovery circuitry connected to receive said digitized television signal and to retrieve therefrom at least one of said first ghost-cancellation reference signal and said second ghost-cancellation reference signal as a function of said first ghost-cancellation reference signal having the same polarity from one field to a next field, and as a function of said second ghost-cancellation reference signal having opposite polarity from one field to the next field, wherein said first ghost-cancellation reference signal is longer than said second ghost-cancellation reference signal, and wherein said second ghost-cancellation reference signal comprises a pseudo-random noise sequence;

adaptive filter coefficient calculation circuitry responsive to at least one of said first and said second ghost-cancellation reference signals; and digital filter circuitry connected to receive said digitized television signal with accompanying multipath distortion, wherein said digital filter circuitry is responsive to adaptive filter coefficients calculated by said adaptive filter coefficient calculation circuitry, and wherein said digital filter circuitry supplies as an output signal, said digitized television signal with reduced multipath distortion.

16. The circuit of claim 15, wherein said first ghost-cancellation reference signal and said second ghost-cancellation reference signal have a substantially flat frequency response.

17. A circuit for processing a digitized television signal, said digitized television signal comprising a succession of frames, where each of said frames comprises a first field and a second field, and where each of said fields comprises a specified number of lines, at least one of said lines being designated to carry a first ghost-cancellation reference signal and a second ghost-cancellation reference signal, said circuit comprising:

signal recovery circuitry connected to receive said digitized television signal and to retrieve therefrom at least one of said first ghost-cancellation reference signal and said second ghost-cancellation reference signal as a function of said first ghost-cancellation reference signal having the same polarity from one field to a next field, and as a function of said second ghost-cancellation reference signal having opposite polarity from one field to the next field, wherein said first ghost-cancellation reference signal is longer than said second ghost-cancellation reference signal, and wherein said second ghost-cancellation reference signal comprises a pseudo-random noise sequence;

adaptive filter coefficient calculation circuitry responsive to at least one of said first and said second ghost-cancellation reference signals; and digital filter circuitry connected to receive said digitized television signal with accompanying multipath distortion, wherein said digital filter circuitry is responsive to adaptive filter coefficients calculated by said adaptive filter coefficient calculation circuitry, and wherein said digital filter circuitry supplies as an output signal, said digitized television signal with reduced multipath distortion.

18. An apparatus for detecting and processing a composite video signal comprising a succession of frames, where each of said frames comprises a first field and a second field, and where each of said fields comprises a specific number of data sequences with at least one of said data sequences in each field containing a first ghost-cancellation reference signal and a second ghost-cancellation reference signal, said apparatus comprising:

means for sampling said composite video signal:

means for recovering from said sampled composite video signal at least one of said first ghost-cancellation reference signal and said second ghost-cancellation reference signal, wherein said first ghost-cancellation reference signal is longer than said second ghost-cancellation reference signal, and wherein said second ghost-cancellation reference signal is a pseudo-random noise sequence having a polarity that is inverted every other field:

means for calculating one or more adaptive filter coefficients as a function of at least one of said first and said second ghost-cancellation reference signals; and filter means for reducing multipath distortion from said sampled composite video signal as a function of said one or more adaptive filter coefficients.

19. The apparatus of claim 18, further comprising:

means for deriving an error signal as a function of a known reference sequence and at least one of said first ghost-cancellation reference signal and said second ghost-cancellation signal.

20. The apparatus of claim 19, wherein said means for calculating one or more adaptive filter coefficients as a function of at least one of said first and said second ghost-cancellation reference signals comprises:

means for calculating one or more adaptive filter coefficients as a function of said error signal.

21. A method for detecting and processing a composite video signal comprising a succession of frames, where each of said frames comprises a first field and a second field, and where each of said fields comprises a specific number of data sequences with one of said data sequences in each field containing a first ghost-cancellation reference signal and a second ghost-cancellation reference signal, said method comprising the steps of:

sampling said composite video signal;

recovering from said sampled composite video signal at least one of said first ghost-cancellation reference signal and said second ghost-cancellation reference signal, wherein said first ghost-cancellation reference signal is longer than said second ghost-cancellation reference signal, wherein said second ghost-cancellation reference signal is a pseudo-random noise sequence, and wherein said polarity of said second ghost-cancellation reference signal is inverted every other frame;

calculating one or more adaptive filter coefficients as a function of at least one of said first and said second ghost-cancellation reference signals; and reducing multipath distortion from said sampled composite video signal as a function of said one or more adaptive filter coefficients.

* * * * *